United States Patent [19]

Diessel et al.

[11] 4,267,068

[45] May 12, 1981

[54] STORAGE-STABLE, POURABLE SILICATE SUSPENSIONS

[75] Inventors: Paul Diessel, Mannheim; Johannes Perner, Neustadt; Bernd Leutner, Frankenthal; Hans-Ulrich Schlimper, Speyer, all of Fed. Rep. of Germany

[73] Assignee: BASF Aktiengesellschaft, Fed. Rep. of Germany

[21] Appl. No.: 41,523

[22] Filed: May 22, 1979

[30] Foreign Application Priority Data

Jun. 3, 1978 [DE] Fed. Rep. of Germany ....... 2824443

[51] Int. Cl.$^3$ .............................................. C11D 3/12
[52] U.S. Cl. ................................ 252/179; 252/174.25; 106/286.7
[58] Field of Search .................... 106/287.17, 73.4, 74; 252/179, 455 Z, 174.25, 173, 303 S, DIG. 14

[56] References Cited

U.S. PATENT DOCUMENTS

| | | | |
|---|---|---|---|
| 3,962,132 | 6/1976 | Haschke et al. | 252/179 |
| 3,962,149 | 6/1976 | Chirasa | 252/174.25 |
| 4,071,377 | 1/1978 | Schwuger et al. | 134/39 |
| 4,083,793 | 4/1978 | Jakobi et al. | 252/99 |

OTHER PUBLICATIONS

Offenlegungsschrift 26 15698, 20/10/77 Gunther et al.

*Primary Examiner*—Theodore Morris
*Attorney, Agent, or Firm*—Keil & Witherspoon

[57] ABSTRACT

A storage-stable, pourable and pumpable aqueous suspension which contains finely divided water-insoluble sodium aluminum silicate and one or more hydroxyl-free saturated or unsaturated aliphatic dicarboxylic acids of 3 to 10 carbon atoms, or their alkali metal salts, as a stabilizer and flow improver.

4 Claims, No Drawings

STORAGE-STABLE, POURABLE SILICATE SUSPENSIONS

The present invention relates to an aqueous suspension of a sodium aluminum silicate (zeolite) which has been converted to an extremely storage-stable, pourable and pumpable form by adding an aliphatic dicarboxylic acid.

Sodium aluminum silicates are used as phosphate substitutes in detergents, as is disclosed, for example, in German Laid-Open Applications DOS Nos. 2,412,836, 2,412,837 and 2,412,838.

A problem encountered is that when compounding such detergents, the above silicates must be handled in the form of relatively highly concentrated aqueous suspensions, or slurries, which are then converted to dry powders by the conventional methods. It has been found that on storage and pumping of such slurries, pronounced sedimentation of the fine silicates frequently occurs, which greatly adds to the difficulty of manufacturing products of consistent quality of the active ingredients. According to German Laid-Open Application DOS No. 2,615,698, an attempt has been made to overcome this problem by adding to an aqueous zeolite suspension a dispersant from the category of the polymeric carboxylic acids, eg. sodium polyacrylate, and a non-surfactant phosphorus-free low molecular weight inorganic or organic salt as a stabilizer; sodium citrate is mentioned, inter alia, as such a salt.

The disadvantage of the above approach is that a component system must be used which constitutes such a high percentage of the finished formulation that the proportion of active substance in the latter is substantially reduced. Furthermore, an expensive organic substance must be employed, which makes the use of the system in detergents less economical, and which additionally presents effluent problems.

It is an object of the present invention to provide an additive which gives silicate suspensions which are stable for at least 24 hours and are pourable and pumpable without sedimentation of the solids.

It is a further object of the invention to provide, as the additive, a material which is very simply obtainable and cheap, is compatible with the detergent substances, and produces the required effect even when used in small amount.

We have found that these objects are achieved, according to the invention, with aqueous sodium aluminum silicate suspensions containing from 20 to 60%, based on the weight of the suspension, of finely divided water-insoluble sodium aluminum silicates, if these contain, as a stabilizer and flow improver, from 0.5 to 15%, based on the weight of the suspension, of one or more hydroxyl-free saturated or unsaturated aliphatic dicarboxylic acids of 3 to 10 carbon atoms, or their alkali metal salts.

The above result is surprising since the closest prior art, namely German Laid-Open Application DOS No. 2,615,698, additionally prescribes, as an essential feature, the use of, for example, a polyacrylate as a dispersant, and states that the organic salt is only effective in conjunction with this polyacrylate.

The suspensions according to the invention as a rule contain from 20 to 60% by weight, preferably from 40 to about 50% by weight, based on the suspension, of a finely divided, water-insoluble sodium aluminum silicate which preferably has the general formula $$(Na_2O)_x \cdot Al_2O_3 \cdot (SiO_2)_y \cdot zH_2O$$

where x is from 0.7 to 1.5, y is from 0.8 to 6 and z is from 3.0 to 7.0.

According to the invention, one or more aliphatic saturated or unsaturated hydroxyl-free dicarboxylic acids or their alkali metal salts are added to the above suspensions. Mixtures of acids or salts may also be added, as is explained later. The dicarboxylic acids are of 3 to 10, preferably of 4 to 6, carbon atoms.

Examples of dicarboxylic acids, which may be used as such or as their alkali metal salts in the suspensions according to the invention are malonic acid, succinic acid, glutaric acid, adipic acid, pimelic acid, suberic acid, azelaic acid, sebacic acid, maleic acid and fumaric acid.

Succinic acid, glutaric acid and adipic acid have proved particularly advantageous.

Mixtures of the individual acids are also effective, and amongst these a mixture of succinic acid, glutaric acid and adipic acid may be singled out. The dicarboxylic acids, referred to for simplicity merely as acids, or their alkali metal salts, are added to the suspensions in concentrations of from about 0.5 to 15%, preferably from 2.5 to 10%, based on the weight of the suspension. They are effective at any pH, though the optimum effect is found at a pH of from about 3 to 14.

The aqueous suspensions according to the invention are highly stable and pumpable and are therefore very suitable for the manufacture of detergents. The addition of further dispersants (surfactants and the like) to the suspensions is not necessary; the suspensions consist of the stated components and are combined with the remaining detergent components only at the stage of compounding the detergent.

The Examples which follow illustrate the invention:

A Experimental conditions

A sodium aluminum silicate known as zeolite A, which had a mean particle size of from 3 to 6 μm and corresponded to the approximate empirical formula $$Na_2O \cdot Al_2O_3 \cdot (SiO_2)_2 \cdot 4.5H_2O$$

was used; it had a pH of about 11 in 1% strength suspension.

The zeolite was tested in the form of 25 and 50% strength by weight suspensions.

The suspensions were stirred for 5 minutes at 1,000 rpm and left to stand in 100 ml measuring cylinders each containing 100 ml of the suspension to be tested. The proportions of clear water in the measuring cylinder were then measured at several intervals of time. The greater the proportion of clear water (the upper layer in the measuring cylinder) at a given time, the less stable the suspension.

Table 1 below shows the results:

TABLE 1

| Stabilizer | % by weight of additive | Viscosity [mPas] | 24 hours | 48 hours | 7 days |
|---|---|---|---|---|---|
| 50% by weight of zeolite A | | | | | |

TABLE 1-continued

| Stabilizer | % by weight of additive | Viscosity [mPas] | 24 hours | 48 hours | 7 days |
|---|---|---|---|---|---|
| 50% by weight of water | | | | | |
| no additive | — | 18 | 37/63 | 37/63 | 37/63 |
| malonic acid | 5 | 785 | 3/97 | 4/96 | 4/96 |
| succinic acid | 5 | 308 | 3/97 | 5/95 | 5/95 |
| maleic acid | 5 | 15 | 9/91 | 8/92 | 7/91 |
| succinic acid/glutaric acid/adipic acid mixture | 5 | 316 | 0/100 | 3/97 | 3/97 |
| 25% by weight of zeolite A 75% by weight of water | | | | | |
| no additive | 0 | 6 | 72/28 | 72/28 | 72/28 |
| succinic acid/glutaric acid/adipic acid mixture | 6 | 435 | 4/96 | 4/96 | 4/96 |
| succinic acid/glutaric acid/adipic acid mixture | 5 | 38 | 12/88 | 12/88 | 12/88 |

In the preceding Table, the first number (in the three right-hand columns) indicates the clear (silicate-free) upper part of the liquid column and the second number the silicate-containing lower part, in % by volume.

In a further experiment, the suspensions were tested at various pH values, obtained by using sulfuric acid. Table 2 shows the results:

TABLE 2

| Sample Zeolite A | 25% of zeolite/75% of water | | |
|---|---|---|---|
| | pH | Stability test 1 day | 1 week |
| a | 10.9 | 57/42 | 58/42 |
| b | 10 | 49/51 | 49/51 |
| c | 9 | 40/60 | 40/60 |
| d | 8 | 33/67 | 34/66 |
| e | 7 | 30/70 | 34/66 |
| f | 6 | 27/73 | 27/73 |
| g | 5 | 23/77 | 23/77 |
| h + 5% of a mixture of succinic acid, glutaric acid and adipic acid | 5.4 | 10/90 | 10/90 |
| i + 10% of a mixture of succinic acid, glutaric acid and adipic acid | 5.05 | 2/98 | 2/98 |
| Zeolite A with a higher content of sodium hydroxide (as an impurity) | | | |
| a | 12.6 | 72/28 | 73/27 |
| b | 10 | 63/37 | 63/37 |
| c | 9 | 58/42 | 60/40 |
| d | 8 | 56/44 | 56/44 |
| e | 7 | 54/46 | 54/46 |
| f | 6 | 49/51 | 49/51 |
| g | 5 | 45/55 | 45/55 |
| h + 5% of a mixture of succinic acid, glutaric acid and adipic acid | 5.45 | 7/93 | 8/92 |

TABLE 2-continued

| Sample Zeolite A | 25% of zeolite/75% of water | | |
|---|---|---|---|
| | pH | Stability test 1 day | 1 week |
| i + 10% of a mixture of succinic acid, glutaric acid and adipic acid | 5.1 | 2/98 | 2/98 |

This Table shows that with decreasing pH there is a slight improvement but it is only on addition of the dicarboxylic acids that the suspensions become stable on storage.

We claim:

1. A storage-stable, pourable and pumpable aqueous suspension which contains, based on the weight of suspension, from 20 to 60% of finely divided, water-insoluble sodium aluminum silicates, together with an organic acid or salt thereof as a stabilizer and flow improver, wherein the organic acid or salt thereof is exclusively one or more hydroxyl-free saturated or unsaturated dicarboxylic acids of 3 to 10 carbon atoms or alkali metal salts thereof, present in an amount of from 0.5 to 15%, based on the weight of the suspension.

2. A suspension as claimd in claim 1, which contains sodium aluminum silicates of the formula

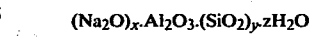

$$(Na_2O)_x \cdot Al_2O_3 \cdot (SiO_2)_y \cdot zH_2O$$

where x is from 0.7 to 1.5, y is from 0.8 to 6 and z is from 3.0 to 7.0.

3. A suspension as claimed in claim 1, wherein the dicarboxylic acid is malonic acid, succinic acid, glutaric acid, adipic acid, pimelic acid, suberic acid, azelaic acid, sebacic acid, maleic acid, fumaric acid or a mixture thereof.

4. A suspension as claimed in claim 1, wherein the dicarboxylic acid is a mixture of succinic acid, glutaric acid and adipic acid.

* * * * *